Dec. 22, 1931.  S. E. WALLACE  1,837,802

FOUNTAIN SHAVING BRUSH

Filed June 25, 1930

INVENTOR
Sadye E. Wallace
BY Harry Bowen
ATTORNEY

Patented Dec. 22, 1931

1,837,802

UNITED STATES PATENT OFFICE

SADYE E. WALLACE, OF SAN FRANCISCO, CALIFORNIA

FOUNTAIN SHAVING BRUSH

Application filed June 25, 1930. Serial No. 463,640.

The invention is a shaving brush having a reservoir for shaving cream in the handle thereof and arranged so that the cream may be forced out through the bristles into the brush.

The object of the invention is to provide a shaving brush in which a supply of cream may be stored in the handle and fed into the brush as desired.

Another object of the invention is to provide a shaving brush which eliminates the necessity of carrying a separate tube of shaving cream when travelling.

A further object of the invention is to provide a shaving brush having a cream reservoir in the handle thereof, in which the reservoir may readily be refilled.

And a still further object of the invention is to provide a brush having a shaving cream reservoir in the handle thereof which is of a simple and economical construction.

With these ends in view the invention embodies a shaving brush having a hollow handle with a removable cap at one end of the handle, a piston in the handle, means for moving the piston from the exterior of the handle and a tube extending from the interior of the handle through the base of the bristles.

Other features and advantages of the invention will appear from the following description taken in connection with the drawings, wherein.

Figure 1:
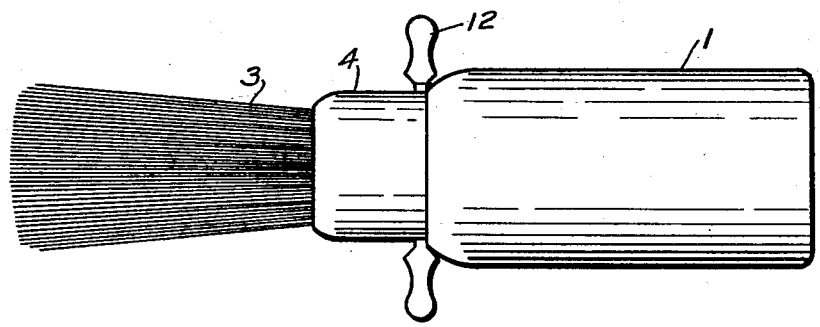
Figure 1 is a view showing the side elevation of the brush.
Figure 2:
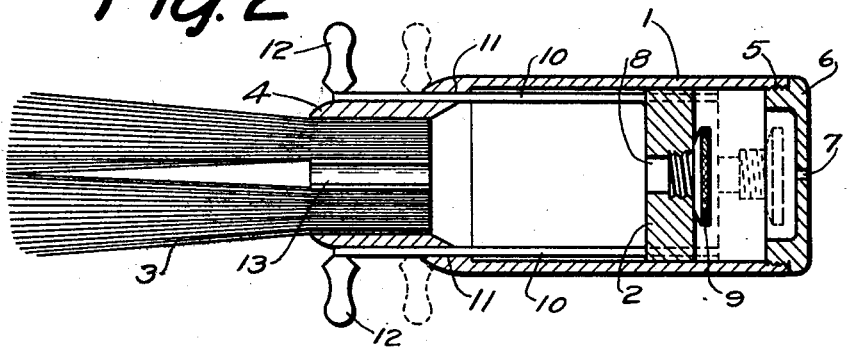
Figure 2 is a longitudinal section through the brush and handle.
Figure 3:
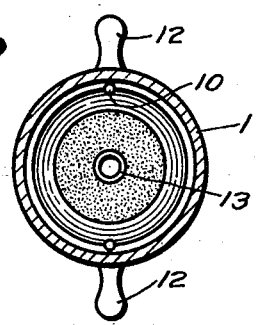
Figure 3 is a cross section through the handle looking toward the brush.

In the drawings the brush is shown as it would be made wherein numeral 1 indicates the handle, numeral 2 the piston and numeral 3 the brush.

The handle 1 is made of a cylindrical piece of material with a portion in one end of a smaller diameter forming a hub 4 in which the bristles of the brush are mounted. The opposite end of the handle is provided with interior threads 5 into which a cap 6 with a small air hole 7 in the center thereof is screwed.

The piston 2 is made of a flat cylindrical shaped piece of material with an opening 8 in the center into which a plug 8 may be screwed as shown. The threads of the plug are similar to the threads of the neck of a tube of shaving cream so that the cap 6 and the plug 9 may be removed and a tube of shaving cream screwed into the opening 8 to refill the reservoir by forcing the contents of the tube through the opening 8. Pull rods 10 extend from the inner face of the piston through openings 11 in the handle and the outer ends are provided with finger grips 12 through which the piston may be moved backward and forward within the handle.

A tube 13 is provided in the center of the base of the brush so that as the piston is drawn toward the brush the cream in the reservoir of the handle will be forced through the tube 13 and into the brush.

It will be understood that changes may be made in the construction without departing from the spirit of the invention.

The construction will be readily understood from the foregoing description. In use the shaving brush may be provided as shown and it will be observed that the reservoir in the handle may be filled with shaving cream and when it is desired to use the brush the grips 12 may be drawn outward so that the cream will be forced into the brush. The brush may then be used in the usual manner. After the cream has been forced into the brush, the grips 12 may be moved backward to the position shown in Figure 1, so that they will not interfere with the use of the brush. When the supply in the reservoir has been exhausted, the brush may be refilled as hereinbefore described.

Having thus fully described the invention, what I claim as new and desire to secure by Letters Patent, is:

In a shaving brush, a handle having a reservoir therein, a brush head mounted in one end of the handle with an opening in the base thereof opening into the reservoir in the handle, a piston in the reservoir of the handle, rods extending from the piston through the handle adjacent the base of the brush, grips at the outer ends of the rods, a removable cap at the outer end of the handle and a removable plug in the said piston, said plug being similar to the threaded neck of a paste tube and when it is removed the tube may be threaded into the piston to refill the reservoir on the other side thereof.

In testimony whereof she affixes her signature.

SADYE E. WALLACE.